United States Patent
Heavens et al.

(10) Patent No.: US 6,634,841 B1
(45) Date of Patent: Oct. 21, 2003

(54) FASTENER ASSEMBLY DEVICE

(75) Inventors: Glenn G. Heavens, Cheshire, CT (US); Albert W. Van Boven, Barrington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/177,426

(22) Filed: Jun. 21, 2002

(51) Int. Cl.⁷ .............................. F16B 33/00; F16B 43/00
(52) U.S. Cl. ...................... 411/368; 411/353; 411/533; 411/999
(58) Field of Search ................................. 411/162, 163, 411/164, 165, 352, 353, 368, 369, 533, 999

(56) References Cited

U.S. PATENT DOCUMENTS

| | | | | |
|---|---|---|---|---|
| 2,672,069 A | * | 3/1954 | Mitchell | 411/368 |
| 4,630,984 A | * | 12/1986 | Reinwall et al. | 411/368 |
| 5,662,444 A | * | 9/1997 | Schmidt, Jr. | 411/533 X |
| 5,975,821 A | * | 11/1999 | Kue | 411/533 |

* cited by examiner

Primary Examiner—Neill Wilson
(74) Attorney, Agent, or Firm—Mark W. Croll; Paul F. Donovan

(57) ABSTRACT

A fastener assembly device is disclosed for fastening workpieces together. The device includes an elongate fastener having a first and a second end. The first end of the fastener defines a head and the fastener includes a threaded portion which extends between the second end of the fastener and the head. A shank portion is disposed between the head and the threaded portion and an annular collar is disposed between the head and the second end of the fastener. A washer cooperates with the fastener, the washer defining an aperture for the reception therethrough of the threaded portion of the fastener. The washer includes a plurality of protrusions which extend towards and cooperate with the annular collar. The arrangement is such that when the threaded portion of the fastener extends through the aperture of the washer, the protrusions interact with the collar for holding the fastener and the washer together. Also, each protrusion of the plurality of protrusions is unevenly spaced circumferentially from an adjacent protrusion.

26 Claims, 6 Drawing Sheets

FASTENER ASSEMBLY DEVICE

FIELD OF THE INVENTION

The present invention relates to a fastener assembly device. More specifically, the present invention relates to a fastener assembly device for fastening workpieces together.

BACKGROUND OF THE INVENTION

Fasteners of the type disclosed in U.S. Pat. No. 4,732,519 to Wagner were developed as a result of complaints from auto manufactures that fasteners for fastening a component to an engine would come out of the washer during transportation of the fastener assembly before use thereof. More specifically, as disclosed in U.S. Pat. No. 4,732,519, when the fastener is inserted through the washer, the annular ring or collar on the fastener becomes damaged in two places where the collar comes into contact with the inwardly protruding two nibs or protrusions of the washer. Consequently, when the fastener rotates, and the damage points line up with the protrusions on the washer, it becomes significantly easier for the fastener to become disassembled from the washer.

In the prior art fastener assemblies, the two protrusions are disposed 180 degrees apart. However, with the two protrusions spaced 180 degrees apart, the device is able to disassemble at two locations. The provision of three protrusions was found to require an increased force for assembly and disassembly. However, although such increased force is advantageous, the provision of three protrusions increases to three the number of locations in which the fastener and washer can become disassembled. In other words, when the protrusions and the damage points in the annular collar are aligned, the fastener can easily become disassembled. Such disassembly will also occur each time the fastener and washer are rotated relative to each other through one third of a revolution, that is, when each of the protrusions is disposed evenly spaced from an adjacent protrusion.

The aforementioned problem is overcome according to the present invention by the provision of protrusions that are unevenly spaced relative to each other. Applicants discovered that when the protrusions are unevenly spaced, the protrusions and damage points are aligned only one time when the fastener and washer are rotated relative to each other through one revolution. Such is the case when two, three or more protrusions are provided. Accordingly, the unevenly spaced protrusions of the present invention greatly reduce the chance of the damage points on annular collar lining up with the protrusions of the washer. More particularly, for an embodiment of the present invention having two protrusion, the protrusions will not be aligned 180 degrees relative to each other. Also, for an embodiment of the present invention having three protrusion, the protrusions will not be located 120 degrees relative to each other.

Therefore, it is a primary feature of the present invention to provide a fastener assembly device that overcomes the problems associated with the prior art arrangements.

Another feature of the present invention is the provision of a fastener assembly device that reduces the chances of the washer and fastener becoming disassembled prior to use Other features and advantages of the present invention will be readily apparent to those skilled in the art by a consideration of the detailed description of a preferred embodiment of the present invention contained herein.

SUMMARY OF THE INVENTION

The present invention relates to a fastener assembly device for fastening workpieces together. The device includes an elongate fastener having a first and a second end. The fastener includes a head defined by the first end of the fastener and a threaded portion which extends between the second end of the fastener and the head. A shank portion is disposed between the head and the threaded portion and an annular collar is disposed between the head and the second end of the fastener. A washer cooperates with the fastener, the washer defining an aperture for the reception therethrough of the threaded portion of the fastener. The washer includes a plurality of protrusions which extend towards and cooperate with the annular collar. The arrangement is such that when the threaded portion of the fastener extends through the aperture of the washer, the protrusions interact with the collar for holding the fastener and the washer together. Also, each protrusion of the plurality of protrusions is unevenly spaced circumferentially from an adjacent protrusion.

In a more specific embodiment of the present invention, the head is a hexagonal type bolt head. Additionally, the head includes an integral spacer. The threaded portion extends from the second end of the fastener to the annular collar and shank portion extends from the head to the annular collar.

Furthermore, the annular collar is disposed between the shank portion and the threaded portion.

Moreover, the annular collar is integrally formed with and disposed between the shank portion and the threaded portion.

Additionally, the fastener including the annular collar are fabricated from steel.

Also, the washer includes a cylindrical portion having a first and a second extremity. A flange extends radially from the first extremity of the cylindrical portion. Also, a further radially extending flange extends from the second extremity of the cylindrical portion.

Moreover, the cylindrical portion defines the aperture for the reception therethrough of the threaded portion.

Additionally, the plurality of protrusions extend radially inwards from the cylindrical portion.

Also, the plurality of protrusions provide an interference fit with the annular collar when the threaded portion is moved axially through the aperture.

In one embodiment of the present invention, the plurality of protrusions includes only a first and a second protrusion. The arrangement is such that a first circumferential distance between the first and the second protrusions is less than a second circumferential distance between the first and the second protrusions. Also, the sum of the first and second distances is equal to a circumference of the annular collar.

In a further embodiment of the present invention, the plurality of protrusions includes a first protrusion and a second protrusion, the second protrusion being spaced a first circumferential distance from the first protrusion. Additionally, a third protrusion is provided, the third protrusion being spaced a second circumferential distance from the second protrusion. Also, the third protrusion is spaced a third circumferential distance from the first protrusion. Furthermore, the sum of the first, second and third distances is equal to a circumference of the annular collar.

Additionally, the first and second distances are unequal.

In another embodiment of the present invention, the second and third distances are unequal.

In yet another embodiment of the present invention, the first and third distances are unequal.

In a further embodiment of the present invention, the first, second and third distances are unequal.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and of the present invention as defined by the appended claims.

Figure 1:
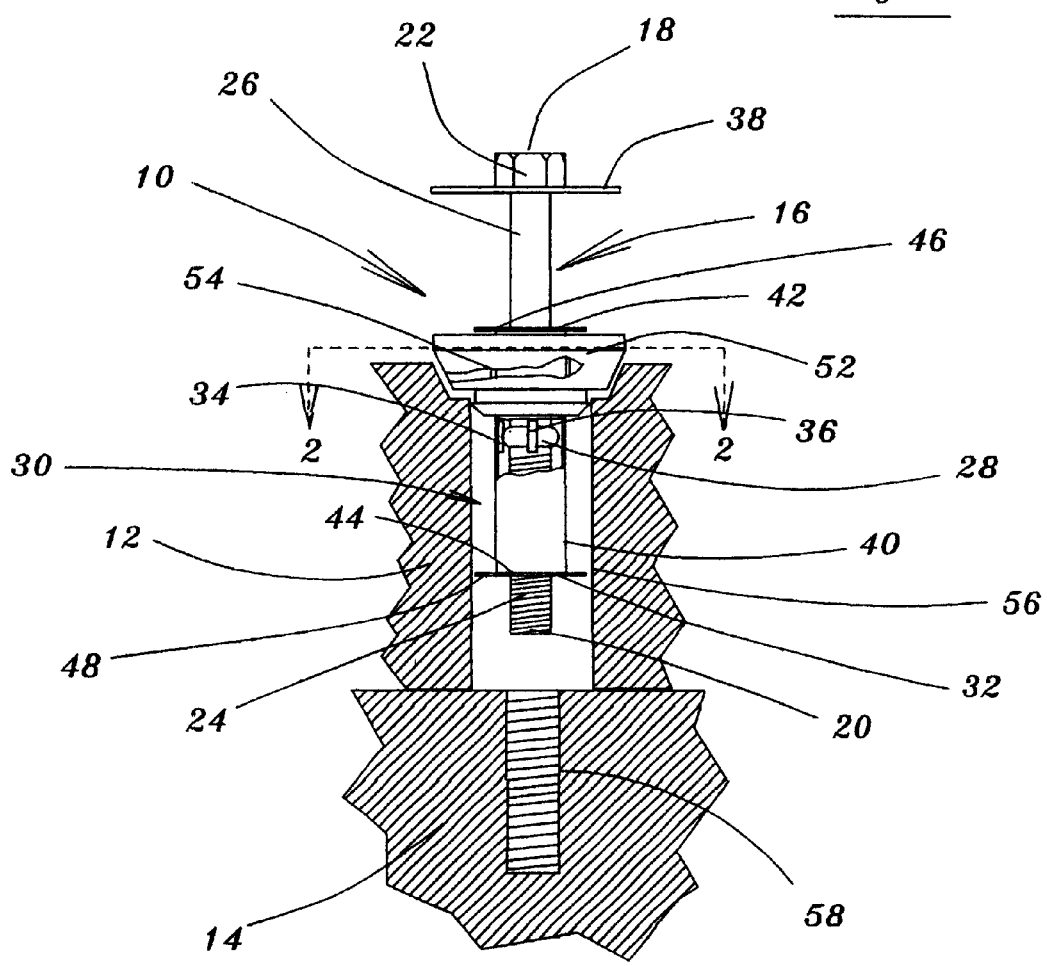
FIG. 1 is a side elevational view partially in section of a fastener assembly device according to the present invention.

Before the embodiments of the invention are explained in detail, it is to be understand that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

FIG. 1 is a side elevational view partially in section of a fastener assembly device generally designated 10 according to the present invention. As shown in FIG. 1, the device 10 is provided for fastening workpieces 12 and 14 together. Typically, the workpiece 12 is a component of an internal combustion engine and the workpiece 14 is a portion of an engine. The component 12 defines a bore 56 and the engine 14 defines a threaded hole 58 which is aligned with the bore 56. The device 10 includes an elongate fastener generally designated 16 having a first and second end 18 and 20 respectively. The fastener 16 includes a head 22 defined by the first and 18 of the fastener 16 and a threaded portion 24 which extends between the second end 20 of the fastener 16 and the head 22. A shank portion 26 is disposed between the head 22 and the threaded portion 24 and an annular collar 28 is disposed between the head 22 and the second end 20 of the fastener 16. A washer generally designated 30 cooperates with the fastener 16, the washer 30 defining an aperture 32 for the reception therethrough of the threaded portion 24 of the fastener 16.

Figure 2:
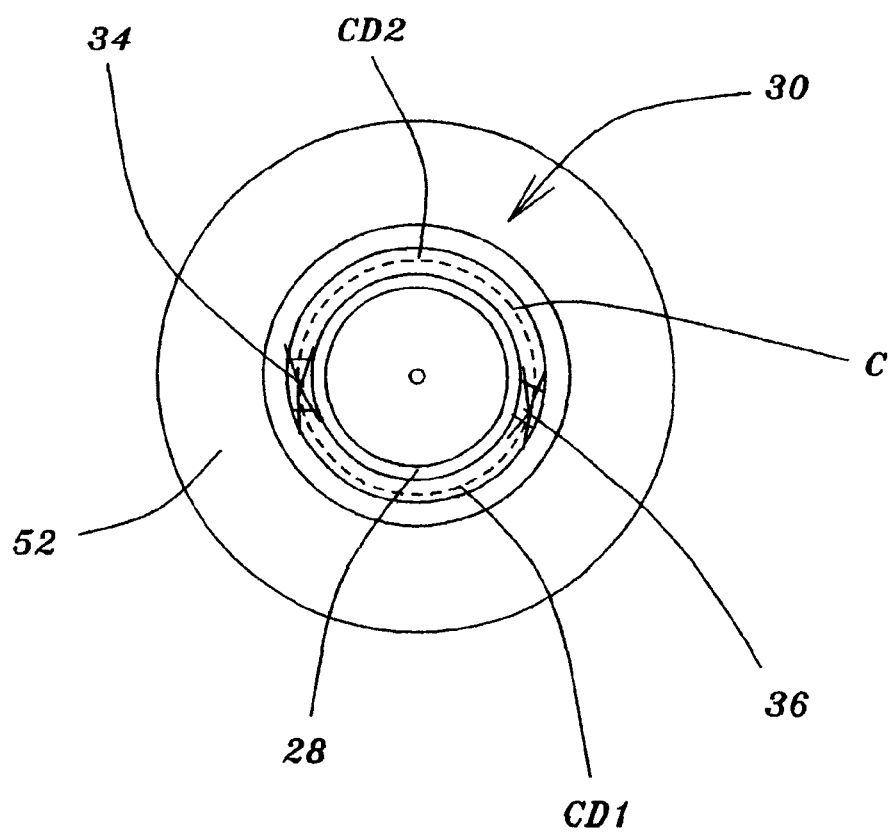
FIG. 2 is an enlarged sectional view taken on the line 2—2 of FIG. 1.

FIG. 2 is an enlarged sectional view taken on the line 2—2 of FIG. 1. As shown in FIG. 2, the washer 30 includes a plurality of protrusions 34 and 36 which extend towards and cooperate with the annular collar 28. The arrangement is such that when the threaded portion 24 of the fastener 16 extends through the aperture 32 of the washer 30, the protrusions 34 and 36 interact with the collar 28 for holding the fastener 16 and the washer 30 together. Also, each protrusion such as protrusion 34 of the plurality of protrusions 34 and 36 is unevenly spaced circumferentially from an adjacent protrusion 36.

As shown in FIG. 1, the head 22 is a hexagonal type bolt head.

Additionally, the head 22 includes an integral spacer 38.

The threaded portion 24 extends from the second end 20 of the fastener 16 to the annular collar 28.

Also, the shank portion 26 extends from the head 22 to the annular collar 28.

Furthermore, the annular collar 28 is disposed between the shank portion 26 and the thereded portion 24.

Moreover, the annular collar 28 is integrally formed with and is disposed between the shank portion 26 and the threaded portion 24. The annular collar 28 and the fastener 16 are fabricated from steel.

Also, the washer 30 includes a cylindrical portion 40 having a first and a second extremity 42 and 44 respectively. A radially extending flange 46 extends from the first extremity 42 of the cylindrical portion 40. Also, a fturther radially extending flange 48 extends from the second extremity 44 of the cylindrical portion 40.

Moreover, the cylindrical portion 40 defines the aperture 32 for the reception therethrough of the threaded portion 24.

Additionally, the plurality of protrusions 34 and 36 extend radially inwards from the cylindrical portion 40.

Also, the plurality of protrusions 34 and 36 provide an interference fit with the annular collar 28 when the threaded portion 24 is moved axially through the aperture 32.

In one embodiment of the present invention as shown in FIG. 1, the plurality of protrusions 34 and 36 includes only a first and a second protrusion 34 and 36 respectively.

As shown in FIG. 2, a first circumferential distance CD1, shown in broken lines, between the first and the second protrusions 34 and 36 is less than a second circumferential distance CD2 between the first and the second protrusions 34 and 36. Also, the sum of the first and second distances CD1 and CD2 is equal to a circumference C of the annular collar 28.

Figure 3:
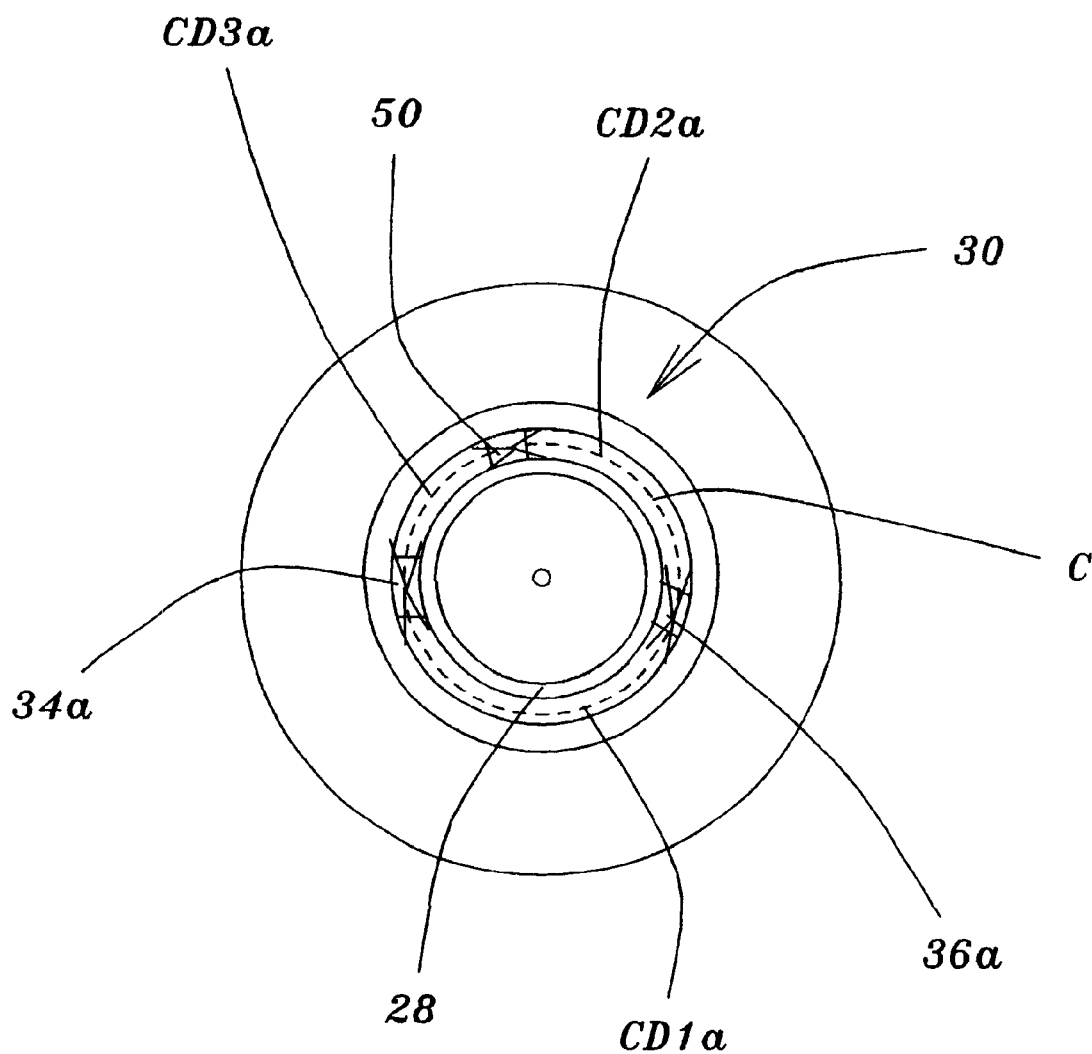
FIG. 3 is a similar view to that shown in FIG. 2 but shows an alternative embodiment of the present invention.

FIG. 3 is a similar view to that shown in FIG. 2 but shows an alternative embodiment of the present invention. As shown in FIG. 3, the plurality of protrusions includes a first protrusion 34a and a second protrusion 36a, the second protrusion 36a being spaced a first circumferential distance CD1a from the first protrusion 34a. Additionally, a third protrusion 50 is provided, the third protrusion 50 being spaced a second circumferential distance CD2a from the second protrusion 36a. Also, the third protrusion 50 is spaced a third circumferential distance CD3a from the first protrusion 34a. Furthermore, the sum of the first, second and third distances CD1a plus CD2a plus CD3a is equal to the circumference C of the annular collar 28.

Additionally, the first and second distances CD1a and CD2a respectively are unequal.

Figure 4:
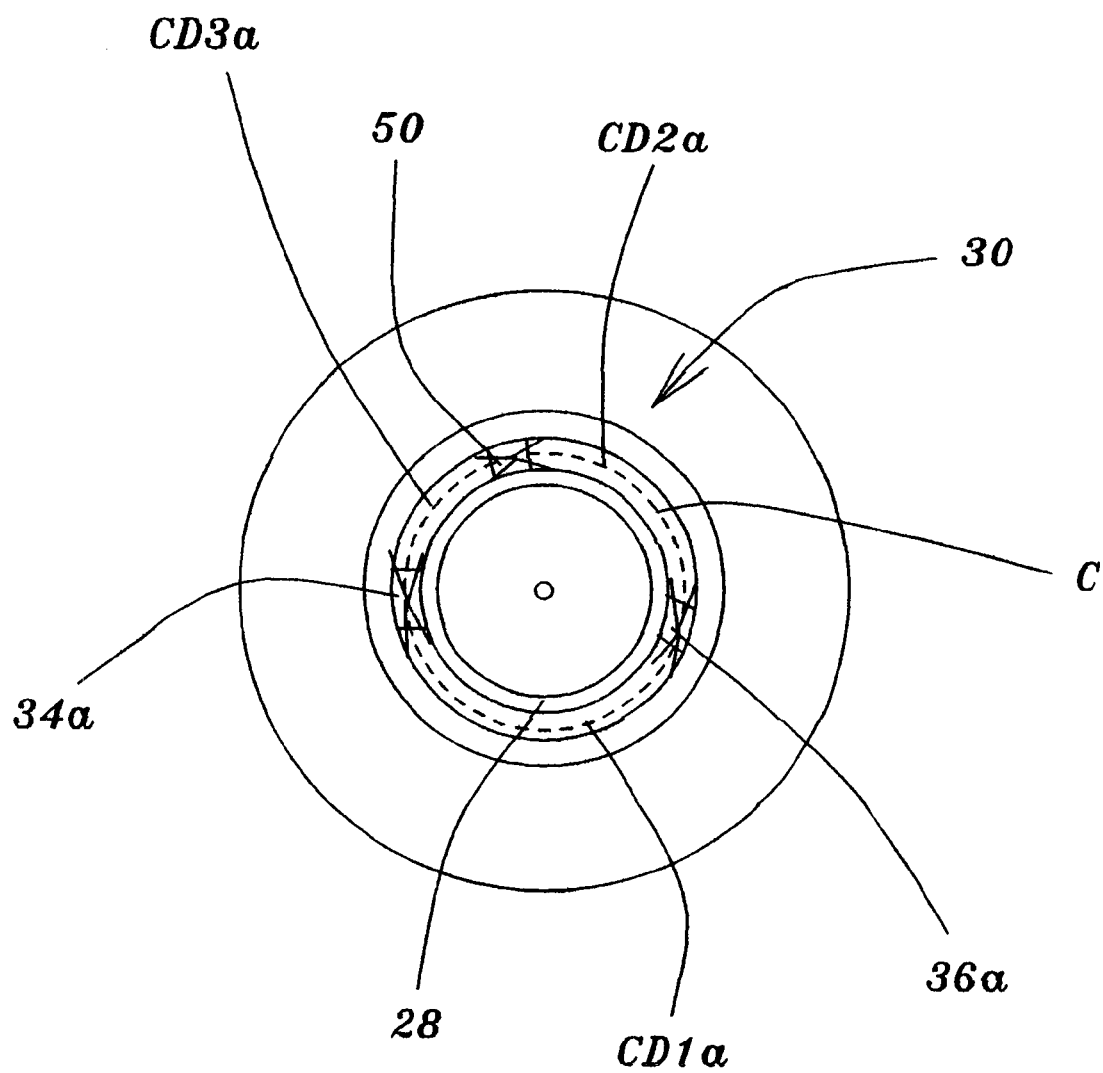
FIG. 4 is a similar view to that shown in FIG. 2 but shows another alternative embodiment of the present invention.

FIG. 4 is a similar view to that shown in FIG. 2 but shows another alternative embodiment of the present invention. As shown in FIG. 4, the second and third distances CD2a and CD3a respectively are unequal.

Figure 5:
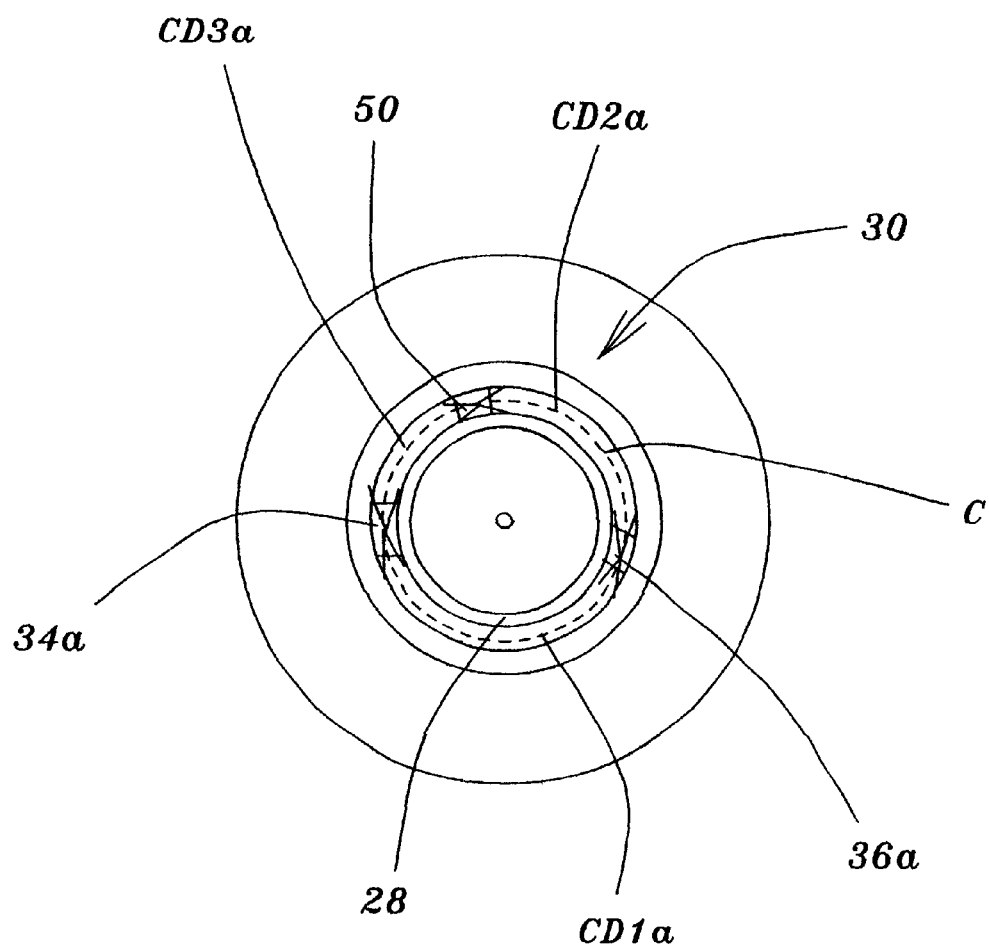
FIG. 5 is a similar view to that shown in FIG. 2 but shows yet a further embodiment of the present invention.

FIG. 5 is a similar view to that shown in FIG. 2 but shows yet a further embodiment of the present invention. As shown in FIG. 5, the first and third distances CD1a and CD3a respectively are unequal.

Figure 6:
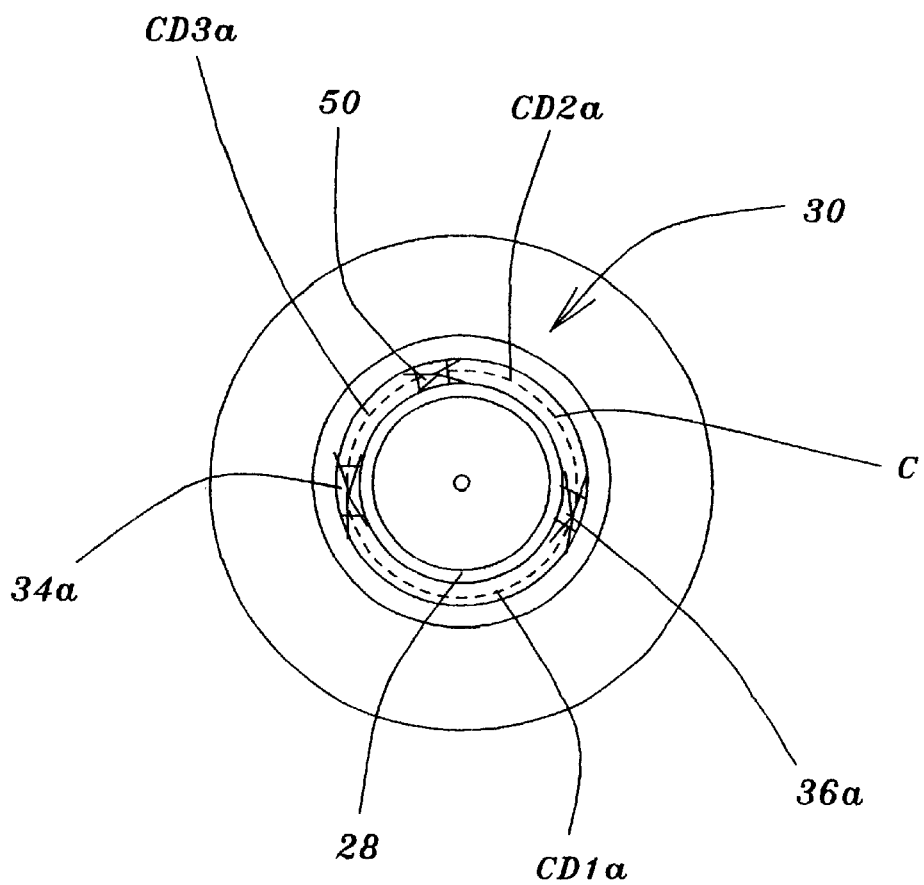
FIG. 6 is a similar view to that shown in FIG. 2 but shows still a further alternative embodiment of the present invention.

FIG. 6 is a similar view to that shown in FIG. 2 but shows an alternative embodiment of the present invention. As shown in FIG. 6, the first, second and third distances CD1a, CD2a and CD3a respectively are unequal to each other. In one preferred embodiment, a second nib is disposed 110 degrees from a first nib, and a third nib is spaced 120 degrees from the second nib and thus, 130 degrees from the first nib. Therefore, as applied to the arrangement shown in FIG. 6, the distance CD1a represents 110 degrees, the distance CD2a represents 120 degrees and the distance CD3a represents 130 degrees.

In each of the embodiments of FIGS. 1–6, the washer 30 is surrounded by a grommet 52. The grommet 52 defines a hole 54 for the reception therethrough of the washer 30 so that the grommet 52, the washer 30 and the fastener 16 combine to form the coaxial fastener assembly device 10.

In operation of the fastener assembly device 10 according to the present invention, the coaxial flexible grommet 52, washer 30 and fastener 16 are inserted through the bore 56 defined by the engine component 12 so that the threaded portion 24 of the fastener 16 cooperates with the aligned threaded hole 58 defined by the engine 14. The arrangement is such that when the head of the fastener 16 is rotated, the threaded portion 24 cooperates with the threaded hole 58 for tightening the engine component 12 relative to the engine 14.

The provision of unevenly spaced protrusions according to the present invention, assists in maintaining the fastener 16 in an assembled disposition relative to the surrounding washer 30.

Variations and modifications of the foregoing are within the scope of the present invention. It is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art. Various features of the invention are set forth in the following claims.

What is claimed is:

1. A fastener assembly device for fastening workpieces together, said device comprising:
   an elongate fastener having a first and a second end;
   said fastener including:
      a head defined by said first end of said fastener;
      a threaded portion which extends between said second end of said fastener and said head;
      a shank portion disposed between said head and said threaded portion; and
      an annular collar disposed between said head and said second end of said fastener; and
   a washer cooperating with said fastener, said washer defining an aperture for the reception therethrough of said threaded portion of said fastener;
   said washer including:
      a plurality of protrusions which extend towards and cooperate with said annular collar such that when said threaded portion of said fastener extends through said aperture of said washer, said protrusions interact with said collar for holding said fastener and said washer together; and
      each protrusion of said plurality of protrusions being unevenly spaced circumferentially from an adjacent protrusion.

2. A fastener assembly device as set forth in claim 1, wherein said head is a bolt type head.

3. A fastener assembly device as set forth in claim 1, wherein said head is a hexagonal type head.

4. A fastener assembly device as set forth in claim 1, wherein said head includes an integral spacer.

5. A fastener assembly device as set forth in claim 1, wherein said threaded portion extends from said second end of said fastener to said annular collar.

6. A fastener assembly device as set forth in claim 1, wherein said shank portion extends from said head to said annular collar.

7. A fastener assembly device as set forth in claim 1, wherein said annular collar is disposed between said shank portion and said threaded portion.

8. A fastener assembly device as set forth in claim 1, wherein said annular collar is integrally formed with and disposed between said shank portion and said threaded portion.

9. A fastener assembly device as set forth in claim 1, wherein said annular collar is of metallic material.

10. A fastener assembly device as set forth in claim 9, wherein said fastener including said annular collar is fabricated from steel.

11. A fastener assembly device as set forth in claim 1, wherein said washer includes a cylindrical portion having a first and a second extremity, a radially extending flange extending from said first extremity of said cylindrical portion, and a further radially extending flange extending from said second extremity of said cylindrical portion.

12. A fastener assembly device as set forth in claim 11, wherein said cylindrical portion defines said aperture for the reception therethrough of said threaded portion.

13. A fastener assembly device as set forth in claim 12, wherein said plurality of protrusions extend radially inwards from said cylindrical portion.

14. A fastener assembly device as set forth in claim 13, wherein said plurality of protrusions provide an interference fit with said annular collar when said threaded portion is moved axially through said aperture.

15. A fastener assembly device as set forth in claim 1, wherein said plurality of protrusions includes only a first arid a second protrusion.

16. A fastener assembly device as set forth in claim 15, wherein a first circumferential distance between said first and said second protrusions is less than a second circumferential distance between said first and said second protrusions, said first and second distances being equal to a circumference of said annular collar.

17. A fastener assembly device as set forth in claim 1, wherein said plurality of protrusions includes a first protrusion, a second protrusion, said second protrusion being spaced a first circumferential distance from said first protrusion, and a third protrusion, said third protrusion being spaced a second circumferential distance from said second protrusion, said third protrusion being spaced a third circumferential distance from said first protrusion, said first, second and third distances being equal to a circumference of said annular collar.

18. A fastener assembly device as set forth in claim 17, wherein said first and second distances are unequal.

19. A fastener assembly device as set forth in claim 17, wherein said second and third distances are unequal.

20. A fastener assembly device as set forth in claim 17, wherein said first and third distances are unequal.

21. A fastener assembly device as set forth in claim 17, wherein said first, second and third distances are unequal.

22. A fastener assembly device as set forth in claim 21, wherein said plurality of protrusions includes a first protrusion, a second protrusion spaced 110 degrees from said first protrusion, and a third protrusion spaced 120 degrees from said second protrusion, said third protrusion also being spaced 130 degrees from said first protrusion.

23. A fastener assembly device for fastening workpieces together, said device comprising:

an elongate fastener having a first and a second end;

said fastener including:
  a head defined by said first end of said fastener;
  a threaded portion which extends between said second end of said fastener and said head;
  a shank portion disposed between said head and said threaded portion; and
  an annular collar disposed between said head and said second end of said fastener; and a washer cooperating with said fastener, said washer defining an aperture for the reception therethrough of said threaded portion of said fastener;

said washer including:
  a plurality of inwardly extending protrusions adapted and arranged so that said washer snaps over said collar to secure the washer and the fastener together; and
  each protrusion of said plurality of protrusions being unevenly spaced circumferentially from an adjacent protrusion.

24. A fastener assembly device for fastening workpieces together, said device comprising:

an elongate fastener having a first and a second end;

said fastener including:
  a head defined by said first end of said fastener;
  a threaded portion which extends between said second end of said fastener and said head;
  a shank portion disposed between said head and said threaded portion; and
  an annular collar disposed between said head and said second end of said fastener; and a washer cooperating with said fastener, said washer defining an aperture for the reception therethrough of said threaded portion of said fastener;

said washer including:
  a plurality of inwardly extending protrusions adapted and arranged so that said washer snaps over said collar to secure the washer and fastener together; and
  each protrusion of said plurality of protrusions being unevenly spaced circumferentially from an adjacent protrusion;

said head being a hexagonal type bolt head;

said threaded portion extending from said second end of said fastener to said annular collar;

said shank portion extending from said head to said annular collar;

said annular collar being disposed between said shank portion and said threaded portion;

said annular collar being integrally formed with and disposed between said shank portion and said threaded portion;

said fastener including said annular collar being fabricated from steel;

said washer including:
  a cylindrical portion having a first and a second extremity;
  a radially extending flange extending from said first extremity of said cylindrical portion;
  a further radially extending flange extending from said second extremity of said cylindrical portion;
  said cylindrical portion defining said aperture for the reception therethrough of said threaded portion;
  said plurality of protrusions extending radially inwards from said cylindrical portion;
  said plurality of protrusions providing an interference fit with said annular collar when said threaded portion is moved axially through said aperture;
  said plurality of protrusions including:
    a first and a second protrusion; and
    a first circumferential distance between said first and said second protrusions being less than a second circumferential distance between said first and said second protrusions, said first and second distances being equal to a circumference of said annular collar.

25. A fastener assembly device as set forth in claim 24, wherein said head includes an integral spacer.

26. A fastener assembly device as set forth in claim 24, further including:
a grommet which defines a hole for the reception therethrough of the washer so that the grommet, the washer and the fastener combine to form the coaxial fastener assembly device.

* * * * *